United States Patent [19]

Iida

[11] Patent Number: 4,535,126
[45] Date of Patent: Aug. 13, 1985

[54] AIR DRYING COATING COMPOSITION

[75] Inventor: Shinji Iida, Hiratsuka, Japan

[73] Assignee: Kansai Paint Company, Ltd., Hyogo, Japan

[21] Appl. No.: 617,564

[22] Filed: Jun. 5, 1984

[30] Foreign Application Priority Data

Jun. 10, 1983 [JP] Japan .................................. 58-104664

[51] Int. Cl.³ ............................................... C08F 8/00
[52] U.S. Cl. ........................................ 525/106; 525/63
[58] Field of Search .................................. 525/63, 106

[56] References Cited

U.S. PATENT DOCUMENTS 3,686,356 8/1972 Saam ...................................... 525/64

FOREIGN PATENT DOCUMENTS 1113764 5/1968 United Kingdom .

Primary Examiner—Melvyn I. Marquis
Attorney, Agent, or Firm—Wenderoth, Lind & Ponack

[57] ABSTRACT

An air drying coating composition comprising a mixture of (A) 9 to 91% by weight of a silicone-modified alkyd resin, a silicone-modified acrylic-grafted alkyd resin and/or a silicone-modified acrylic resin and (B) 91 to 9% by weight of a carboxyl group-containing chlorinated polyolefin resin as a resinous binder.

7 Claims, No Drawings

AIR DRYING COATING COMPOSITION

This invention relates to an air drying coating composition, and more specifically, to an air drying coating composition containing a mixture of a silicone-modified resin and a carboxyl group-containing chlorinated polyolefin resin as a film-forming component and having excellent weather resistance, chemical resistance and adhesion.

Primers and top coatings for imparting long-term corrosion resistance have previously been applied to various steel structures, for example ships, bridges, tanks, iron towers, chimneys, and steel structures used in various industrial plants. Top coatings used in coating systems for steel structures include, for example alkyd resin paints of long or medium oil length (to be abbreviated as "alkyd resin paints"), chlorinated rubber paints, epoxy resin paints, and urethane resin paints. In addition to these top coating paints, vinyl resin paints, acrylic resin paints, vinyl-grafted acrylic resin paints, acrylic-grafted alkyd resin paints, silicone-modified alkyd resin paints, silicone-modified acrylic resin paints, and silicone-modified acrylic-grafted alkyd resin paints have also been used for specific end uses.

Among these top coating paints, the alkyd resin paints and chlorinated rubber paints are most widely used in the fild of the aforesaid anticorrosive paints. These top coatings are of the one-package type and have excellent coatability and handability, and their cost is relatively low. However, they have insufficient resistance to weather and light (to be referred to as weather resistance), and generally develop chalking in the coated films in about 1 to 5 years after application. Frequently, the coated films undergo discoloration, cracking, and peeling, and it is presently necessary to perform recoating usually within 2 to 5 years although this period somewhat differs depending upon the degree of degradation of the coated films.

On the other hand, the recent increase in the cost of paints and labor has led to an increase in the cost of recoating, and it is desired to develop coating systems which can prolong the required recoating time as much as possible. Thus, there have been an increasing number of instances where urethane resin paints, silicone-modified acrylic resin paints, silicone-modified alkyd resin paints, silicone-modified acrylic-grafted alkyd resin paints, etc. which have much better weather resistance than the alkyd resin paints or chlorinated rubber paints are applied as top coats.

The urethane resin paints require mixing prior to use because they are two-package paints including an isocyanate compound as a curing agent. Furthermore, since these paints have a limited pot life, much restrictions are imposed in regard to operating efficiency in the operation of coating outdoor steel structures which is performed in most cases in high or narrow places.

The silicone-modified acrylic resin paints have the defect that they have poor solvent resistance, the operability of applying multicoats is not good, and the coated films are liable to soften by heat to gather soot or dust in the air. Furthermore, in the preparation of the silicone-modified acrylic resin paints, the molecular weight or viscosity of the acrylic resin as a base is restricted in order to react it sufficiently with a silicone. It is difficult therefore to obtain paints having sufficient water resistance or chemical resistance. Another problem is that the acrylic resin itself does not necessarily have sufficient water resistance or chemical resistance.

The silicone-modified alkyd resin paints, because of the air drying effect of their oil component, do not undergo heat softening, and coated films prepared therefrom are substantially free from contamination in the air. In addition, they have good coating operability inherent to alkyd resins, and do not require mixing prior to use because they are of the one-package type. Hence, these paints are suitable for coating in places in which the working condition is rigorous, for example outdoors or in high or narrow places. However, in order to react an alkyd resin fully with a silicone, the viscosity or acid value of the alkyd resin as a base is restricted. For this reason, the product does not necessarily have sufficient water resistance and chemical resistance. Another problem is that the alkyd resin itself has worse water resistance, adhesion and chemical resistance than acrylic resins.

The silicone-modified acrylic-grafted alkyd resin paints have similar advantages and defects to the aforesaid silicone-modified alkyd resin paints.

As stated above, the top coating paints now available for steel structures have their own advantages and disadvantages. If, therefore, the water resistance and chemical resistance of these paints could be improved, it would be possible to obtain an innovative top coating paint eliminating all defects of the top coating paints now in use, namely a top coating paint which (1) has excellent weather resistance, (2) is of the one-package type and easy to handle under all coating conditions, (3) has excellent operability in coating, and (4) posesses good water resistance, adhesion, chemical resistance and soiling resistance.

As a means of remedying the aforesaid defects of the silicone-modified alkyd resins, silicone-modified acrylic-grafted alkyd resins and silicone-modified acrylic resins, the present inventors took up a chlorinated polyolefin resin which has excellent water resistance and chemical resistance, a relatively high glass transition point, superior soiling resistance and relatively good weather resistance, and extensively studied the application of this resin to a silicone-modified alkyd resin, a silicone-modified acrylic-grafted alkyd resin, a silicone-modified acrylic resin or a mixture of these resins. This work has finally led to the discovery that by using a specific proportion of a chlorinated polyolefin resin having a specific acid value, there can be obtained a top coating paint which has all the functions required for air drying highly weather-resistant top coating paints not realized inn the past in any paints, and which contributes to the great improvement of the quality of long-term corrosion-resistant coating systems and the reduction of their cost.

Thus, according to this invention, there is provided an air drying coating composition comprising as a resinous binder a mixture composed of (A) 9 to 91% by weight of a silicone-modified alkyd resin, a silicone-modified acrylic-grafted alkyd resin and/or a silicone-modified acrylic resin and (B) 91 to 9% by weight of a carboxyl group-containing chlorinated polyolefin resin.

Known silicone-modified alkyd resins, silicone-modified acrylic-grafted alkyd resins and silicone-modified acrylic resins may be used in this invention as component (A). Typical examples are shown below.

(1) Silicone-modified alkyd resins

Alkyd resins as a base for the silicone-modified alkyd resins are obtained by condensing in a customary manner a polyhydric alcohol component such as ethylene glycol, propylene glycol, diethylene glycol, butylene glycol, glycerol, trimethylolethane, trimethylolpropane or pentaerythritol and a polybasic acid component such as phthalic anhydride, isophthalic acid, terephthalic acid, trimellitic acid, tetrahydrophthalic anhydride, succinic acid, adipic acid, sebacic acid and maleic anhydride optionally using drying oils, their fatty acids, semidrying oils or their fatty acids for modifying the alkyd resins. Examples of the modifying component, as fatty acids, include safflower oil fatty acid, linseed oil fatty acid, soybean oil fatty acid, sesame oil fatty acid, poppy-seed oil fatty acid, perilla oil fatty acid, hempseed oil fatty acid, corn oil fatty acid, tall oil fatty acid, sunflower oil fatty acid, cottonseed oil fatty acid, walnut oil fatty acid, rubberseed oil fatty acid, tung oil fatty acid, oiticica oil fatty acid, dehydrated castor oil fatty acid, and Hidiene fatty acid (a tradename for a product of Soken Kagaku Co., Ltd.). The modification of the alkyd resins with silicones is carried out in a customary manner by reacting the alkyd resins with known silicone resin intermediates at a temperature of 120° to 230° C. using a catalyst such as tetrapropyl titanate. The silicon resin intermediates preferably have a reactive group such as a hydroxyl group or an alkoxy group in the molecule, and examples are "Z-6018" and "DC-3037" of Dow Corning Company, "KR-218" and "KR-7218" of Shinetsu Chemical Co., Ltd., "SY-231" of Wacker Chemie GmbH, "RM-100" of Bayer AG, and "TSR-165" of Toshiba-Silicone Company. The structures of typical examples of the silicone resin intermediates are shown below.

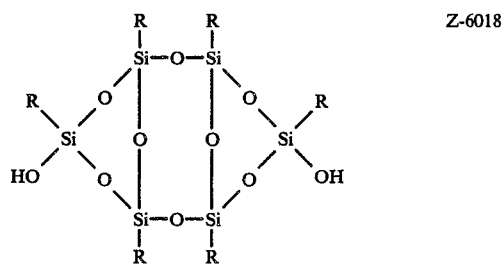

R: alkyl

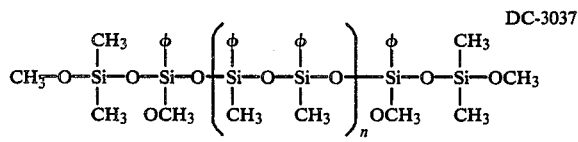

φ:phenyl; n:0–2

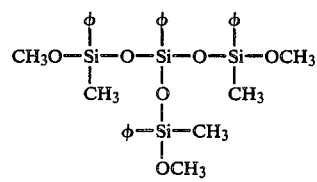

φ:phenyl (2) Silicone-modified acrylic-grafted alkyd resins

The acrylic-grafted alkyd resin as a base for the silicone-modified acrylic-grafted alkyd resins can be synthesized by using such an alkyd resin as exemplified in (1) above, and copolymerizing the unsaturated fatty acid group or the active methylene group in the alkyd resin with such an acrylic monomer as shown in (3) below. Alternatively, it may be synthesized by reacting a functional group (such as a hydroxyl group or a carboxyl group) present in the alkyd resin with a functional group (such as an acid anhydride group, an epoxy group, a carboxyl group or a hydroxyl group) present in the molecules of an acrylic resin prepared in advance.

The modification of the acrylic-grafted alkyd resin with a silicone can be carried out in the same way as in the production of the silicone-modified alkyd resin using the aforesaid silicone resin intermediates.

Conveniently, the silicon-modified alkyd resin and silicone-modified acrylic-grafted alkyd resin described in (1) and (2) have an oil length of 15 to 60%, preferably 30 to 50%, more preferably 35 to 45%, a silicone content of 20 to 60% by weight, preferably 30 to 45% by weight, and an acid value of 5 to 30, preferably 5 to 15. When the oil length is less than 15%, the amount of the plasticizing component in the resins decreases, and the resin becomes hard and brittle so that good coating operability or good film properties are difficult to obtain. If the silicone content is less than 20% by weight, the weather resistance of the coated film is reduced to the level which an ordinary alkyd resin or acrylic-grafted alkyd resin has. If it exceeds 60% by weight, the resulting resin tends to have reduced compatibility with the chlorinated polyolefin resin. If the acid value of the resin is below 5, good compatibility with the chlorinated polyolefin resin is difficult to obtain. If it exceeds 30, the storage stability of the resin itself or the dispersion stability of a basic pigment may possibly become poor.

(3) Silicone-modified acrylic resins

The acrylic resin as a base for the silicone-modified acrylic resins can be obtained by (co)polymerizing known acrylic monomers. Typical examples of the acrylic monomers include $C_1$–$C_{18}$ alkyl esters of acrylic or methacrylic acid such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate and lauryl methacrylate; $C_2$–$C_{18}$ alkoxyalkyl esters of acrylic or methacrylic acid such as methoxybutyl acrylate, methoxybutyl methacrylate, methoxyethyl acrylate, methoxyethyl methacrylate, ethoxybutyl acrylate and ethoxybutyl methacrylate; glycidyl acrylate and glycidyl methacrylate; $C_2$–$C_3$ alkenyl esters of acrylic or methacrylic acid such as allyl acrylate and allyl methacrylate; and $C_2$–$C_8$ hydroxyalkyl esters of acrylic or methacrylic acid such as hydroxyethyl acrylate, hydroxyethyl methacrylate, hydroxypropyl acrylate and hydroxypropyl methacrylate.

According to the desired properties, a vinyl aromatic monomer such as styrene, alpha-methylstyrene, vinyltoluene and p-chlorostyrene, or an unsaturated monomer such as acrylonitrile, methacrylonitrile, butadiene and isoprene may be used as a comonomer in addition to the aforesaid acrylic monomers. When the vinyl aromatic monomer is used together, its amount is properly adjusted to up to 10% by weight based on the entire monomers because too much of it reduces the compatibility of the acrylic resin.

The acrylic resin is synthesized in a customary manner by polymerizing at least one acrylic monomer exemplified above, but desirably has a hydroxyl group in the molecule because it should be modified with the silicone resins. The hydroxyl value of the acrylic resin, as a measure of its hydroxyl group content, is from 50 to 200, preferably 80 to 150. Advantageously, the acrylic resin has a number average molecular weight of about 10,000 to about 200,000, preferably about 50,000 to about 100,000.

If the hydroxyl value of the acrylic resin is less than 50, it cannot fully be modified with the silicone resin intermediate. If, on the other hand, it exceeds 200, there is a tendency of the resulting silicone-modified acrylic resin to have reduced compatibility with the carboxyl group-containing chlorinated polyolefin resin (B). If the number average molecular weight of the acrylic resin is less than 10,000, the properties of coated films from the resulting modified resin are deteriorated. On the other hand, when the molecular weight exceeds 200,000, the compatibility of the resulting resin with the carboxyl group-containing chlorinated polyolefin resin (B) becomes poor, and moreover, the resulting coating composition has an increased viscosity and is difficult to apply.

The modification of the acrylic resin with a silicone can be carried out in the same way as in the production of the silicone-modified alkyd resin (1) using the aforesaid silicone resin intermediates.

Desirably, the resulting silicone-modified acrylic resins generally have a silicone content of 20 to 50%, preferably 25 to 45%, more preferably 30 to 40%. If the silicone content is below 20% by weight, the weather resistance of the coated films is reduced and approach that of an ordinary acrylic resin. On the other hand, if it exceeds 50%, there is a tendency of the silicone-modified acrylic resin to lose compatibility with the chlorinated polyolefin resin.

The carboxyl group-containing chlorinated polyolefin resin (B) used in this invention is a chlorinated polyolefin resin having a carboxyl group (COOH) introduced in its molecular structure, such as chlorinated polyethylene, chlorinated polypropylene, chlorinated ethylene/propylene copolymer and chlorinated polyisobutene. Carboxyl group-containing chlorinated polyethylene and carboxyl group-containing chlorinated polypropylene are especially suitable in combination with the silicone-modified resin (A) used in this invention.

Introduction of the carboxyl group into the chlorinated polyolefin resin can be carried out by a method known per se. For example, there can be used a method which comprises oxidizing a chlorinated polyolefin, and grafting a monomer containing a carboxyl group (see the specification of Japanese Laid-Open Patent Publication No. 102892/1973); a method which comprises chlorinating polyethylene in the presence of an acid anhydride thereby to introduce the carboxyl group (see U.S. Pat. No. 2,825,723); and a method which comprises grafting an unsaturated monomer having a carboxyl group to a polyolefin resin and thereafter chlorinating the product (see the specification of Japanese Laid-Open Patent Publication No. 42794/1976).

Desirably, the carboxyl group-containing chlorinated polyolefin resin (B) used in this invention has an acid value, as a measure of its carboxyl group content, of generally 5 to 30, preferably 7 to 22, and more preferably 10 to 18. If the acid value of the resin is less than 5, the compatibility of the chlorinated polyolefin resin (B) with the aforesaid silicone-modified alkyd resin, silicone-modified acrylic-grafted alkyd resin, silicone-modified acrylic resin and a mixture of these is reduced. On the other hand, if the acid value of the carboxyl group-containing chlorinated polyolefin resin exceeds 30, the storage stability of the resulting coating composition or the dispersibility of a basic pigment in it tends to be reduced.

The chlorine content of the carboxyl group-containing chlorinated polyolefin resin differs depending upon the kind of the polyolefin resin, but is generally about 20 to 75% for polyethylene, and about 20 to 70% for polypropylene. It can be properly selected according to the desired property.

Typical examples of the carboxyl group-containing chlorinated polyolefin resin (B) are "Superchlon 507", "Superchlon 510" and "Superchlon 515", tradenames for products of Sanyo-Kokusaku Pulp Co., Ltd.

The air drying coating composition of this invention contains a mixture of (A) the silicone-modified alkyd resin, silicone-modified acrylic-grafted alkyd resin and/or silicone-modified acrylic resin and (B) the carboxyl group-containing chlorinated polyolefin resin as a resinous binder. The mixing proportions of the components (A) and (B) are 9 to 91% by weight for component (A) and 91 to 9% by weight for component (B), preferably 30 to 80% by weight for component (A) and 70 to 20% by weight for component (B), and more preferably 50 to 70% by weight for component (A) and 30 to 50% by weight for component (B).

In preparing the resin mixture composed of the components (A) and (B), it is preferred to blend them such that the proportion of the silicone component in the resulting resin mixture becomes 5 to 57% by weight, preferably 10 to 30% by weight, more preferably 10 to 20% by weight, based on the weight of the mixture. If the proportion of the silicone component in the resin mixture is less than 5% by weight, the weather resistance of the coating composition of this invention is not sufficiently enhanced. On the other hand, if it exceeds 57% by weight, it is difficult to obtain good compatibility between the components (A) and (B).

A plasticizer may also be incorporated in the coating composition of this invention in order to improve the mechanical strength, coating operability and storage stability of the resulting coated films. Known plasticizers used in ordinary chlorinated polyolefin resins or vinyl resins may be used. Examples are phthalic acid esters, glycollic acid esters, phosphates, adipic acid esters, chlorinated paraffins, esterified oils, oils and fats, epoxy resins and ethylene/vinyl acetate copolymer.

When plasticizers are to be used together, the suitable proportion of the plasticizers is up to 45% based on the entire resin components.

In the present invention, known pigments used in ordinary coating compositions may also be incorporated in the coating composition. Examples are colored pigments such as red iron oxide, titanium white and carbon black; body extender pigments such as talc, clay and mica; and anticorrosive pigments such as chromate salts, strontium chromate and basic lead silicate. These pigments may be used in any desired amounts.

Furthermore, in order to prevent sedimentation of pigments, sagging of the coating composition, and popping and to improve the coating operability of the coating composition, it is possible, as required, to use commercially available sedimentation preventing agents, sag preventing agents and thickeners. Organic solvents used in ordinary paints may be used to adjust the viscosity of the coating composition of this invention.

The following examples illustrate the present invention more specifically. All parts and percentages in these examples are by weight.

PRODUCTION EXAMPLE 1

A closed, alkyd resin-manufacturing apparatus equipped with a thermometer, a stirrer and a device for removing water generated by condensation was charged with 160 parts of phthalic anhydride, 30 parts of benzoic acid, 20 parts of pentaerythritol, 130 parts of trimethylolpropane, 200 parts of soybean oil fatty acid and 30 parts of xylene, and they were reacted at 230° C. for 6 hours in a stream of nitrogen. Water of condensation generated was removed from the system. The temperature of the reaction mixture was lowered to 170° C., and 250 parts of a silicone resin intermediate ("Z-6018", a tradename for a product of Dow Corning Company), 2 parts of tetrapropyl titanate and 500 parts of xylene were added, and the reaction was carried out at this temperature for 6 hours. After the reaction, xylene was added, and a silicone-modified alkyd resin solution (A) having a solids content of 60% was obtained.

PRODUCTION EXAMPLES 2 TO 6

In accordance with the recipes shown in Table 1, silicone-modified alkyd resin solutions (B) to (F) were prepared by the same method as in Production Example 1.

PRODUCTION EXAMPLE 7

The same reaction apparatus as in Production Example 1 was charged with 120 parts of phthalic anhydride, 60 parts of benzoic acid, 30 parts of pentaerythritol, 100 parts of trimethylolethane, 20 parts of ethylene glycol, 300 parts of linseed oil fatty acid and 20 parts of xylene, and the esterification was carried out in the same way as in Production Example 1. Then, the temperature of the reaction mixture was lowered to 120° C., and a monomeric mixture composed of 50 parts of methyl methacrylate, 100 parts of n-butyl methacrylate, 50 parts of isobutyl methacrylate, 30 parts of ethyl acrylate and 2 parts of benzoyl peroxide was added dropwise uniformly with stirring over 3 hours to perform polymerization. After the addition of the monomeric mixture, the reaction mixture was aged for 1 hour, and a solution of 3 parts of benzoyl peroxide in 10 parts of xylene was added dropwise over 1 hour to perform polymerization reaction. The reaction mixture was then aged for 2 hours.

The temperature of the reaction product was raised to 170° C., and 300 parts of the silicone resin intermediate ("DC-3037", a tradename for a product of Dow Corning Company), 3 parts of tetrapropyl titanate and 500 parts of xylene were added, and the reaction was carried out for 6 hours. After the reaction, xylene was added to form a silicone-modified acrylic-graft alkyd resin solution (G) having a solids content of 50%.

PRODUCTION EXAMPLES 8 TO 10

Silicone-modified acrylic-grafted alkyd resin solutions (H) to (J) were prepared in accordance with the recipes shown in Table 1 in the same way as in Production Example 7.

PRODUCTION EXAMPLE 11

A mixture of the monomers and the polymerization initiator shown in Table 1 was added dropwise uniformly with stirring to 100 parts of xylene in a closed, acrylic resin producing apparatus equipped with a thermometer and a stirrer at 120° C. over the course of 3 hours to perform polymerization. After the addition of the monomers, the mixture was aged for 1 hour. Then, a solution of 6 parts of alpha, alpha'-azobisisobutyronitrile in 20 parts of xylene was added dropwise uniformly to the reaction mixture over 1 hour to continue the polymerization reaction. The reaction mixture was aged for 2 hours to complete the polymerization reaction.

The temperature of the reaction product was raised to 140° C., and 390 parts of "DC-3037", 4 parts of tetrapropyl titanate and 500 parts of xylene were added to obtain a silicone-modified acrylic resin solution (K) having a solids content of 50%. The above reactions were all carried out in an atmosphere of nitrogen.

PRODUCTION EXAMPLES 12 TO 15

Silicone-modified acrylic resin solutions (L) to (O) were prepared in accordance with the recipes shown in Table 1 in the same way as in Production Example 11. In Production Example 12, the reaction of the silicone with the acrylic resin was carried out at 160° C.

TABLE 1

| Starting materials | Production Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| | Resin solution | | | | | | | | | | | | | | |
| | A | B | C | D | E | F | G | H | I | J | K | L | M | N | O |
| Phthalic anhydride | 160 | 100 | 100 | 160 | 100 | 100 | 120 | 150 | 120 | 140 | | | | | |
| Isophthalic anhydride | | 30 | 20 | | 40 | | | 20 | | | | | | | |
| Tetrahydrophthalic anhydride | | | 10 | | | 20 | | | | | | | | | |
| Benzoic acid | 30 | | | | | 80 | 70 | 60 | | 10 | | | | | |
| p-t-Butylbenzoic acid | | 60 | 50 | 30 | | | | 20 | | | | | | | |
| Glycerol | | 30 | 20 | | 20 | | | | | | | | | | |
| Pentaerythritol | 20 | | | 20 | 10 | 30 | 30 | 30 | 20 | 20 | | | | | |
| Trimethylolethane | | 100 | 120 | 120 | | 100 | 100 | | 120 | 120 | | | | | |
| Trimethylolpropane | 130 | | | | 120 | | | 140 | | | | | | | |
| Ethylene glycol | | | 30 | 20 | | 20 | 20 | | | 20 | | | | | |
| Soybean oil fatty acid | 200 | | | | 110 | 300 | | 220 | | | | | | | |
| Linseed oil fatty acid | | 250 | | 200 | | 500 | 300 | | | 250 | | | | | |
| Tall oil fatty acid | | | 400 | | | | | 200 | | | | | | | |
| Dehydrated castor oil fatty acid | | | | 60 | | | | | | | | | | | |
| Xylene | 30 | 20 | 20 | 20 | 20 | 30 | 20 | 30 | 20 | 20 | | | | | |
| Styrene | | | | | | | | 50 | 40 | | 30 | 50 | | | 300 |
| Methyl methacrylate | | | | | | | 50 | 100 | | 50 | 160 | 140 | 150 | 350 | 50 |
| n-Butyl methacrylate | | | | | | | 100 | 80 | 100 | 100 | 250 | 200 | 250 | 250 | 150 |

TABLE 1-continued

| Starting materials | Production Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| | Resin solution | | | | | | | | | | | | | | |
| | A | B | C | D | E | F | G | H | I | J | K | L | M | N | O |
| iso-Butyl methacrylate | | | | | | | 50 | 100 | | 100 | 80 | 160 | 100 | 80 | |
| 2-Hydroxyethyl acrylate | | | | | | | | 20 | | 20 | 70 | 80 | 80 | 50 | 80 |
| Ethyl acrylate | | | | | | | 30 | | 20 | 10 | 20 | 50 | 50 | 170 | 20 |
| α,α'-Azobisisobutyronitrile | | | | | | | | | | | 6 | 7 | 6 | 9 | 6 |
| Benzoyl peroxide | | | | | | | 2 | 4 | 2 | 3 | | | | | |
| Z-6018 | 250 | 300 | 450 | 80 | 300 | 250 | | 350 | 950 | | | 320 | | | |
| DC 3037 | | | | | | | 300 | | | 400 | 390 | | 370 | 100 | 400 |
| Tetrapropyl titanate | 2 | 3 | 4 | 1 | 3 | 2 | 3 | 3 | 7 | 4 | 4 | 4 | 4 | 1 | 4 |
| Xylene | 500 | 500 | 600 | 500 | 500 | 500 | 500 | 500 | 700 | 500 | 500 | 450 | 500 | 500 | 500 |

The resin solutions obtained in Production Examples 1 to 15 above were tested for their compatibility with various chlorinated polyolefin resins. The results are summarized in Table 2.

The test for compatibility was carried out as follows: The two resins were mixed so that the weight ratio of these as solids content was 1:3, 1:1, and 3:1, respectively. Each of the resulting resin solutions was coated on a transparent glass plate by a doctor blade to a dry thickness of 30 to 40 microns, and left to stand indoors at 15° to 25° C. for 24 hours. Then, the compatibility of these resins with each other was evaluated by the degree of the transparency of the coated film.

In Table 2, the ratings of the compatibility were as follows:

○: No haze exists, and the compatibility is good.
Δ: Haze exists slightly, and the compatibility is somewhat poor.
X: Haze exists, and the compatibility is poor.

EXAMPLES 2 TO 9

In each run, a coating composition was prepared in accordance with the recipes shown in Table 3 in the same way as in Example 1.

Each of the coating compositions obtained in Examples 1 to 9 was brush-coated to a dry thickness of 30 to 40 microns to a shot-blasted mild steel plate on which a commercial epoxy zinc-rich primer, a commercial anti-corrosive chlorinated rubber paint and a commercial chlorinated rubber intermediate coating paint to standard thicknesses, and dried indoors at 15° to 25° C. for 7 days to form a test plate.

For a bending test to be described, a test plate was prepared by the method set forth in JIS K-5400 6.16.

The test plates were subjected to the tests described below, and the results are shown in Table 4.

COMPARATIVE EXAMPLES 1 AND 2

TABLE 2

| Resin (A) of Production Example | Silicone content (%) | Oil Length (%) | Acid value | Amount of styrene (%) | Carboxyl-containing chloriated polyolefin resin (B) | | | | | | | | | | | | | | | | |
|---|---|---|---|---|---|---|---|---|---|---|---|---|---|---|---|---|---|---|---|---|---|
| | | | | | Superchlon 507 (*) | | | Superchlon 510 (*) | | | Superchlon 515 (*) | | | Chlorinated polypropylene | | | Chlorinated polyethylene | | | Chlorinated rubber | | |
| | | | | | Rate of the chlorinated polyolefin to the silicone resin | | | | | | | | | | | | | | | | | |
| | | | | | 3:1 | 1:1 | 1:3 | 3:1 | 1:1 | 1:3 | 3:1 | 1:1 | 1:3 | 3:1 | 1:1 | 1:3 | 3:1 | 1:1 | 1:3 | 3:1 | 1:1 | 1:3 |
| 1 | 34 | 28 | 8.3 | — | | | | | | | | | | X | X | Δ | X | X | Δ | X | X | Δ |
| 2 | 37 | 33 | 6.9 | — | | | | | | | | | | X | X | Δ | X | X | X | X | X | X |
| 3 | 40 | 37 | 7.8 | — | | | | | | | | | | X | X | Δ | X | X | X | X | X | X |
| 7 | 27 | 29 | 7.0 | — | | | | | | | | | | Δ | X | Δ | Δ | X | Δ | X | X | Δ |
| 8 | 30 | 17 | 6.6 | 4 | | | | | | | | | | Δ | X | Δ | Δ | X | Δ | X | X | Δ |
| 11 | 39 | — | — | 3 | | | | | | | | | | Δ | Δ | Δ | Δ | Δ | Δ | Δ | Δ | Δ |
| 12 | 32 | — | — | 5 | | | | | | | | | | Δ | Δ | Δ | Δ | Δ | Δ | Δ | Δ | Δ |
| 13 | 37 | — | — | — | | | | | | | | | | Δ | Δ | Δ | Δ | Δ | Δ | Δ | Δ | Δ |
| 6 | 20 | 63 | 9.7 | — | Δ | Δ | Δ | Δ | X | Δ | X | X | Δ | X | X | X | X | X | X | X | X | X |
| 9 | 62 | 14 | 5.7 | 3 | Δ | Δ | Δ | Δ | X | X | Δ | X | X | X | X | X | X | X | X | X | X | X |
| 15 | 40 | — | — | 30 | Δ | Δ | Δ | Δ | Δ | Δ | Δ | Δ | Δ | X | X | X | X | X | X | X | X | X |
| 4 | 12 | 45 | 8.4 | — | | | | | | | | | | Δ | Δ | Δ | X | Δ | Δ | X | Δ | Δ |
| 10 | 35 | 22 | 3.7 | — | Δ | Δ | Δ | Δ | Δ | Δ | Δ | Δ | Δ | Δ | Δ | X | X | X | X | X | X |
| 14 | 10 | — | — | — | | | | | | | | | | Δ | X | Δ | Δ | X | Δ | X | X | X |
| 5 | 42 | 15 | 16.5 | — | | | | | | | | | | Δ | Δ | Δ | Δ | Δ | Δ | Δ | Δ | Δ |

(*)Tradenames for products of Sanyo Pulp Co., Ltd.

EXAMPLE 1

A coating composition in accordance with this invention was prepared by mixing 15.0 parts of the silicone-modified alkyd resin solution (A), 21.0 parts of Superchlon 507, 0.5 part of an epoxy resin, 3.0 parts of diisooctyl adipate, 26.0 parts of titanium white, 4.5 parts of barium sulfate and 30.0 parts of xylene by a paint mixer.

In accordance with the recipes shown in Table 3, coating compositions were prepared in the same way as in Example 1 and coated. The results of the testing of the coated plates are shown in Table 4.

COMPARATIVE EXAMPLES 3 TO 7

The following coating paints were coated in the same way as in the above Examples, and tested. The results are shown in Table 4.

Comparative Example 3: commercial chlorinated rubber top coating paint (white)

Comparative Example 4: commercial silicone-modified alkyd resin top coating paint (white)
Comparative Example 5: commercial silicone-modified acrylic resin top coating paint (white)
Comparative Example 6: commercial urethane resin top coating paint (white)
Comparative Example 7: commercial alkyd resin top coating paint (white)

TABLE 3

| Starting materials | Example 1 | Example 2 | Example 3 | Example 4 | Example 5 | Example 6 |
|---|---|---|---|---|---|---|
| Titanium white | 26.0 | | 20.0 | | 26.0 | 20.0 |
| Oxide red | | 15.0 | | | | |
| Carbon black | | | 1.0 | | | |
| Cyanine blue | | | | 8.0 | | 2.0 |
| Barium sulfate | 4.5 | | 3.0 | | | 3.0 |
| Calcium carbonate | | 8.0 | | 2.0 | 4.5 | |
| Resin solution (D) | | | | | | |
| Resin solution (A) | 15.0 | | | | | |
| Resin solution (B) | | 25.0 | | | | |
| Resin solution (C) | | | 30.0 | | | |
| Resin solution (G) | | | | 30.0 | | |
| Resin solution (H) | | | | | 21.0 | |
| Resin solution (K) | | | | | | 36.0 |
| Resin solution (L) | | | | | | |
| Resin solution (M) | | | | | | |
| Resin solution (N) | | | | | | |
| Resin solution (E) | | | | | | |
| Superchlon 507 | 21.0 | | | | 15.0 | |
| Superchlon 510 | | 15.0 | | | | 12.0 |
| Superchlon 515 | | | 12.0 | 15.0 | | |
| Epoxy resin | 0.5 | 0.4 | 0.3 | 0.4 | 0.4 | 0.3 |
| Diisooctyl adipate | 3.0 | | | 3.0 | | 3.0 |
| Epoxidized soybean oil | | 3.0 | | | | |
| Diisodecyl phthalate | | | 3.0 | | | |
| Chlorinated paraffin | | | | | 8.0 | |
| Xylene | 30.0 | 33.6 | 30.7 | 41.6 | 25.1 | 23.7 |
| Total | 100.0 | 100.0 | 100.0 | 100.0 | 100.0 | 100.0 |

| Starting materials | Example 7 | Example 8 | Example 9 | Comparative Example 1 | Comparative Example 2 |
|---|---|---|---|---|---|
| Titanium white | | | | | 26.0 |
| Oxide red | 15.0 | | 10.0 | | |
| Carbon black | | 3.0 | | 3.0 | |
| Cyanine blue | | | | | |
| Barium sulfate | 8.0 | | 4.5 | 7.0 | |
| Calcium carbonate | | 7.0 | 8.0 | | 4.5 |
| Resin solution (D) | | | | 25.0 | |
| Resin solution (A) | | | | | |
| Resin solution (B) | | | | | |
| Resin solution (C) | | | | | |
| Resin solution (G) | | | | | |
| Resin solution (H) | | | | | |
| Resin solution (K) | | | | | |
| Resin solution (L) | 19.0 | | | | |
| Resin solution (M) | | 13.0 | | | |
| Resin solution (N) | | | | | 10.2 |
| Resin solution (E) | | | 30.0 | | |
| Superchlon 507 | 21.0 | | | | 21.0 |
| Superchlon 510 | | 21.0 | 12.0 | | |
| Superchlon 515 | | | | 15.0 | |
| Epoxy resin | 0.5 | 0.5 | 0.3 | 0.4 | 0.5 |
| Diisooctyl adipate | | | 3.0 | | |
| Epoxidized soybean oil | | | | | 3.0 |
| Diisodecyl phthalate | 3.0 | | | 3.0 | |
| Chlorinated paraffin | | 7.5 | | | |
| Xylene | 33.5 | 48.0 | 32.2 | 46.6 | 34.8 |
| Total | 100.0 | 100.0 | 100.0 | 100.0 | 100.0 |

The tests shown in Table 4 were carried out by the following methods.

60° Mirror surface gloss

Measured in accordance with the method set forth in JIS K-5400 6.7.

Pencil hardness

Measured in accordance with the method set forth in JIS K-5400 6.14.

Crosscut tape adhesion

In accordance with the method set forth in JIS K-5400 6.15, one hundred squares were provided on a coated film surface by crosscutting. An edhesive Cellophane tape was applied to the surface of these squares and then abruptly peeled off. The number of squares which remained was counted.

Bending resistance

Measured in accordance with the method set forth in JIS K-5400 6.16. When no change occurred, a rating of o was given.

Water resistance

A coated film was immersed in water at 20° C. for 21 days in accordance with the method set forth in JIS K-5400 7.2. The condition of the coated film was then evaluated by a rating of o which shows that no change occurred to the coated film, which shows that a very small blister was noted, and Δ which shows that a small blister was seen to occur.

Chemical resistance

A coated film was immersed in a 1% aqueous solution of sodium hydroxide at 20° C. for 24 hours in accordance with the method set forth in JIS K-5400 7.4. The condition of the coated film was then examined, and evaluated by a rating of o which shows that no change occurred to the coated film, which shows that a very small blister was seen to occur, Δ which shows that a small blister was seen to occur, and X which shows that a large blister was observed all over the surface.

Salt spray resistance

A coated film was tested in accordance with the method set forth in JIS K-5400 7.8 continuously for 7 days. The condition of the coated film was examined and evaluated by a rating of o which shows that no change occurred to the coated film, which shows that a very small blister was seen to occur, Δ which shows that a small blister was seen to occur. Rust was noted in all of the test specimens only slightly at the cut portion and in its vicinity, and was therefore excluded from the above evaluation.

Accelerated weather resistance

A coated film was exposed to irradiation for 1600 hours by a Sunshine Weather-Ometer of Suga Testing Machine Company. After exposure, the condition of the coated surface was observed and the 60° specular gloss of the coated surface was measured. The occurrence of chalking on the coated srurace is shown by "CH", and the occurrence of cracking on the coated surface, by "CR". Where there was no particular change, a rating of o was given. The gloss retention was the retention of 60° specular gloss.

Weather resistance by ourdoor exposure

A test piece was exposed for 2 years at Komagoe Seashore, Shimizu-shi, Japan while the test piece was directed southward at an angle of 45 degrees. Then, the condition of the coated surface was observed, and the 60° specular gloss of the coated film was measured. The coated film was evaluated by the same method as described above for the accelerated weather resistance.

TABLE 4

| Example (Ex.) or Comparative Example (CEx.) | 60° specular gloss | Pencil hardness | Cross-cut tape adhesion | Bending resistance | Water resistance | Chemical resistance | Salt spray resistance | Accelerated weather resistance Gloss retention | Accelerated weather resistance Condition of the cooled surface | Weather resistances by outdoor exposure Gloss retention | Weather resistances by outdoor exposure Condition of the cooled surface |
|---|---|---|---|---|---|---|---|---|---|---|---|
| Ex. 1 | 90 | HB | 100/100 | | | | | 72 | | 78 | |
| Ex. 2 | 92 | F | 100/100 | | | | | 75 | | 76 | |
| Ex. 3 | 95 | F | 100/100 | | | | | 85 | | 88 | |
| Ex. 4 | 85 | HB | 100/100 | | | | | 80 | | 78 | |
| Ex. 5 | 90 | B | 100/100 | | | | | 74 | | 73 | |
| Ex. 6 | 88 | H | 100/100 | | | | | 89 | | 85 | |
| Ex. 7 | 83 | HB | 100/100 | | | | | 73 | | 75 | |
| Ex. 8 | 93 | F | 100/100 | | | | | 68 | | 70 | |
| Ex. 9 | 91 | H | 90/100 | | | | | 60 | | 62 | |
| CEx. 1 | 85 | HB | 100/100 | | | | | 52 | | 40 | CH |
| CEx. 2 | 89 | F | 100/100 | | | | | 50 | | 34 | CH |
| CEx. 3 | 85 | F | 100/100 | | | | | 30 | CH | 25 | CH |
| CEx. 4 | 90 | HB | 90/100 | Δ | X | Δ | | 60 | | 65 | |
| CEx. 5 | 85 | F | 100/100 | | Δ | Δ | | 65 | | 72 | |
| CEx. 6 | 95 | H | 100/100 | | | | | 65 | | 75 | |
| CEx. 7 | 80 | 2B | 85/100 | Δ | X | Δ | | 12 | CH.CR | 9 | CH |

What is claimed is:

1. In an air drying coating composition comprising a resinous binder, the improvement wherein the resinous binder comprises a mixture of (A) 9% to 91% by weight of a silicone-modified alkyd resin, a silicone-modified acrylic-grafted alkyd resin and/or a silicone-modified acrylic resin, the silicone modification of the alkyd, acrylic-grafted alkyd and acrylic resins being achieved by reacting said resin with a silicone resin having a reactive group selected from hydroxyl and alkoxy in the molecule and (B) 91% to 9% by weight of a carboxyl group-containing chlorinated polyolefin resin.

2. The composition of claim 1 wherein the proportion of the silicone component is 5 to 57% by weight based on the weight of the resin mixture.

3. The composition of claim 1 wherein the silicone-modified alkyd resin and the silicone-modified arcylic-grafted alkyd resins have an oil length of 15 to 60%, a silicone content of 20 to 60% by weight, and an acid value of 5 to 30.

4. The composition of claim 1 wherein the silicone content of the silicone-modified acrylic resin is 20 to 50% by weight.

5. The composition of claim 1 wherein the carboxyl group-containing chlorinated polyolefin resin is a carboxyl group-containing chlorinated polyethylene resin and/or a carboxyl group-containing chlorinated polypropylene resin.

6. The composition of claim 1 wherein the carboxyl group-containing chlorinated polyolefin resin has an acid value of 5 to 30.

7. The composition of claim 1 wherein the silicone resin employed to achieve modification is selected from the group consisting of

Z-6018

R is alkyl,

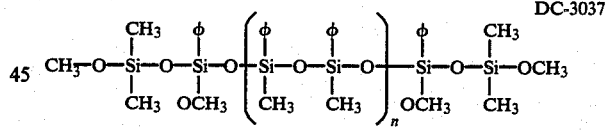

φ is phenyl; n is 0-2, and

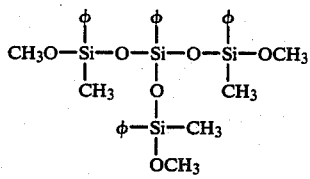

φ is phenyl.

* * * * *